Jan. 18, 1927.
C. T. HANSEN
CAR SEAT
Filed Dec. 5, 1923
1,614,954
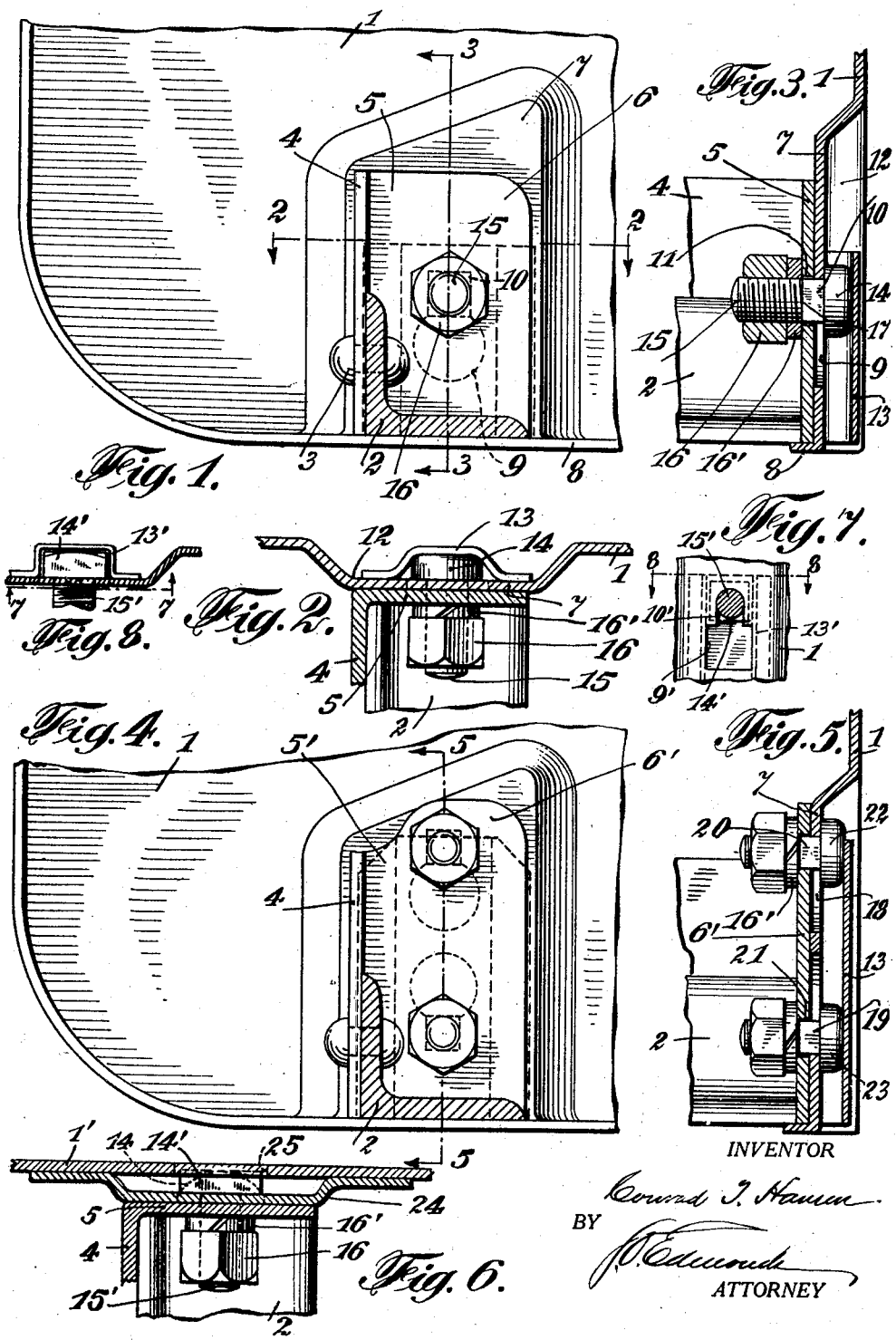
INVENTOR
Conrad T. Hansen
BY
J. Edmunds
ATTORNEY Patented Jan. 18, 1927.

1,614,954

UNITED STATES PATENT OFFICE.

CONRAD T. HANSEN, OF DETROIT, MICHIGAN, ASSIGNOR TO THE AMERICAN MOTOR BODY CORPORATION, OF PHILADELPHIA, PENNSYLVANIA, A CORPORATION OF DELAWARE.

CAR SEAT.

Application filed December 5, 1923. Serial No. 678,577.

This invention relates to improvements in car seats, more particularly relating to the end structure thereof, and to means for attaching connecting rails to seat end plates of the car seat.

Car seats are subjected to constant jarring and vibration which tend to work loose the connections in the seats. The loosening of connections in a seat is very objectionable since it often results in the displacement of parts, and, in seats of the reversing type, often interferes immediately with the proper reversing of the seat, besides causing rattle and noise and increasing the wear upon the parts where the connection is loose. At the same time simplicity, cheapness, durability and permanency are very much desired.

One important connection which should not work loose is the connection between the cross rails and the seat end. In certain types of reversible seats, the loosening of the connections at these points is apt to interfere immediately with the proper manipulation of the seat. The principal object of my invention is to provide a strong and durable connection between cross rails and seat ends, and a connection which will not work loose under the strains of use and travel. Another object of my invention is to provide a strong, durable and light car seat construction which facilitates the assembly of the seat into the car structure. A further object of my invention is to provide an improved seat end construction which permits the attachment of the wall end plate to the wall of the car before the remainder of the seat construction is set up. Other objects of my invention will be in part obvious and in part pointed out hereinafter.

The invention accordingly consists in the features of construction, combinations of elements and arrangement of parts which will be exemplified in the construction hereinafter set forth and the scope of the application of which will be indicated in the following claims.

In accordance with my invention, the connection between a seat end and a connecting rail is accomplished by means of one or more bolts which penetrate the seat end from the outside and extend through suitable bolt holes in a flange provided on or attached to the connecting rail. For each bolt the seat end has a key-hole shaped slot, permitting the bolt to be engaged with the seat end from the inside by moving the bolt head through the larger portion of the slot and then moving the bolt radially to engage the head behind the narrower portion of the slot. The seat end is preferably provided with a lower horizontal flange positioned to come beneath the end of the connecting rail, preventing downward movement of the rail. When a single bolt is used, it abuts the top of the slot in the seat end to prevent upward movement of the rail. This method of attachment is applicable to both wall seat ends and aisle seat ends, and may be employed either with the plain pan or with the armrest type of seat. This method of attaching the connecting rail to a seat end also permits the wall seat end to be attached to a car wall before the remainder of the seat construction is set up or connected therewith. This permits the car builder to complete his work upon receiving the wall ends alone and obviates the necessity of his waiting for the entire seat construction. The remainder of the car seat construction may be attached in place at any time and place after the seat end has been attached to the car walls.

In order that a clearer understanding of my invention may be had, attention is hereby directed to the accompanying drawings forming a part of this application and illustrating certain possible embodiments of my invention. Referring to the drawings, Fig. 1 is a side view of a fragment of a seat end showing a cross rail secured thereto; Fig. 2 is a horizontal sectional view of the same, and is taken on the line 2—2 of Fig. 1; Fig. 3 is a vertical sectional view of the same, and is taken on the line 3—3 of Fig. 1; Fig. 4 is similar to Fig. 1, but shows a modified form of construction; Fig. 5 is a vertical sectional view of the same; Fig. 6 is a view similar to Fig. 2 but shows a modified construction of the seat end; Fig. 7 is a sectional view taken on the line 7—7 of Fig. 8 showing a standard square headed bolt and a key-hole slot modified somewhat as to shape; and Fig. 8 is a sectional view taken on the line 8—8 of Fig. 7. Similar reference characters refer to similar parts throughout the several views of the drawings.

Referring to Figs. 1, 2 and 3 of the drawings, I provide a seat end plate 1, preferably of sheet metal, and which may be either a wall end plate or an aisle end plate. Suitable cross rails 2, preferably of angle shape, are secured, as by means of rivets 3, to the protruding wall 4 of an angular shaped bracket 5, the other wall 6 of which is adapted to lie flat against an offset surface 7 formed in end plate 1. Offset portion 7 may be flanged inwardly, as at 8, so as to extend beneath bracket 5 and cross rail 2. Offset surface 7 of end plate 1 is provided with a key-hole slot, which, for a special round headed bolt 15, has a circular portion 9 and a smaller squared portion 10, but which, for a standard square headed bolt 15′, has a square portion 9′ and a smaller portion 10′ (see Fig. 7). Wall 6 of bracket 5 has a suitable square aperture 11 adapted to align with the aperture portion 10 or 10′ in the end plate. Within the pocket 12, formed in the end plate by reason of offsetting the surface 7, is preferably secured, as by welding, a channel strip 13 or 13′ which extends across the key-hole aperture, and is close enough so that the bolt is held in the upper slot by friction of the head between the strip and the seat end plate 1, and is so shaped that when a square bolt head 14′ is engaged therein the bolt is held thereby against turning.

After the end plate 1, serving as a wall end plate, has been secured to the wall of a car, by any suitable means, not shown, the bracket 5 and cross rail 2 may be secured to the end plate by inserting the head 14 or 14′ of a bolt 15 or 15′ through the aperture portion 9 or 9′, moving the bolt radially into the smaller aperture 10 or 10′, threading the bolt through the aperture 11 in the bracket 5, and clamping the parts together by means of a nut 16. The round headed bolt 15 is preferably provided with a special square shank portion 17 which is adapted to fit closely within the square portion 10 of the aperture in the seat end, and also within the square aperture 11 in the bracket wall 6, whereby the bolt is prevented from turning when the nut 16 is turned thereon. The square headed bolt 15′ does not require such a square shank portion since its head is engaged to prevent its turning when the nut is screwed up. A longer bearing and increased leverage is obtained with the square-headed bolt arrangement. Preferably, a split washer 16′ is used in conjunction with the nut 16.

When a single bolt construction is employed, the bolt hole preferably is slotted on the downward side to take the head of the bolt. The angle bracket hole, when placed over the projecting end of the bolt and resting upon flange 8 of the plate 1, establishes an interlocking condition which prevents the rail from shifting out of proper position.

Although it has been found satisfactory to use only one bolt for securing the bracket 5 to the end plate, the construction may be modified to permit the use of two bolts. In Figures 4 and 5 I have shown such modified construction. The construction shown in these figures is similar to the construction shown above, except that the offset surface 7 of the end plate 1 is provided with two key-hole slots, 18 and 19, and the wall 6′ of the bracket 5′ is made sufficiently large to accommodate two apertures, 20 and 21, through which the securing bolts, 22 and 23, will extend. In this modification the slots 18 and 19 are placed in opposed relation so that the bolts in their final positions will engage the plate 1 in opposed directions and thus prevent the connecting rail from shifting out of proper position. Otherwise, the construction and assembly is the same as the construction and assembly already described, and may be arranged for either round headed bolts or for square headed bolts, and the apertures 20 and 21 may accordingly be either square or round to fit square or round bolt shank portions.

Instead of pocketing plate 1 and securing channel member 13 or 13′ to its outer side, this plate may be flat, as at 1′, and a channel member 24 may be secured, as by welding or otherwise, to the inner surface of the plate 1′. The key-hole slots for one or more bolts 15 or 15′ are provided in channel member 24 instead of in the plate. One or more clearance pockets or apertures 25 for the bolt head or heads 14 or 14′ are preferably provided in the pan 1′ immediately behind the key-hole slots. This permits the connecting rail feature to be interchangeable with both the straight plate seat end and the pocketed plate seat end. The plain pan seat end is preferably used as an aisle end. When a square headed bolt 14′ is used, it is prevented against turning when the nut is tightened by the engagement of the edges of plate 1 at the aperture against the sides of the bolt head.

From the above, it will be readily apparent that the cross rails and securing brackets may readily and easily be attached and be detached from the seat end after the seat end has been attached to the wall of a car. To attach the seat it is merely necessary to engage the bolts with a seat end, thread the brackets 5 thereover, and secure the parts together by means of the nuts.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In seat construction, the combination with a seat end and a plurality of securing bolts having heads, said seat end having a plurality of key-hole slots, one for each bolt, and two of said slots extending in different directions, whereby two of said bolts may be engaged with said seat end from the inner surface thereof so as to extend inwardly therethrough, with the heads of the bolts engaging the seat end behind the slots and the shanks of the bolts engaging the seat end from different directions, and a bracket having perforations for said bolts aligning with the reduced portions of the key-hole slots, whereby the bracket is prevented from moving vertically.

2. In seat construction, the combination with a seat end and a plurality of securing bolts having heads, said seat end having a plurality of key-hole slots, one for each bolt, and two of said slots extending in different directions, whereby two of said bolts may be engaged with said seat end from the inner surface thereof so as to extend inwardly therethrough, with the heads of the bolts engaging the seat end behind the slots and the shanks of the bolts engaging the seat end from different directions, a bracket having perforations for said bolts aligning with the reduced portions of the key-hole slots, whereby the bracket is prevented from moving vertically, and strips on the outer side of the seat end at the key-hole slots preventing outward displacement of the bolts.

3. In seat construction, the combination with a seat end and a plurality of securing bolts having heads, said seat end having a plurality of key-hole slots, one for each bolt, and two of said slots extending in different directions, whereby two of said bolts may be engaged with said seat end from the inner surface thereof so as to extend inwardly therethrough, with the heads of the bolts engaging the seat end behind the slots and the shanks of the bolts engaging the seat end from different directions, and a bracket having perforations for said bolts aligning with the reduced portions of the key-hole slots, whereby the bracket is prevented from moving vertically, aligning portions of the key-hole slots and perforations being squared, and the bolts having squared portions coacting therewith, whereby the bolts are prevented from turning.

This specification signed this 12th day of November, 1923.

CONRAD T. HANSEN.